United States Patent
Sugie et al.

(10) Patent No.: US 11,900,684 B2
(45) Date of Patent: Feb. 13, 2024

(54) SERVER, VEHICLE DETECTION SYSTEM, AND VEHICLE DETECTION METHOD

(71) Applicant: TOYOTA JIDOSHA KABUSHIKI KAISHA, Toyota (JP)

(72) Inventors: Yui Sugie, Nagoya (JP); Koichi Suzuki, Miyoshi (JP); Naoki Uenoyama, Nagoya (JP); Hiroki Takeda, Okazaki (JP); Hirohiko Morikawa, Toyota (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 17/538,526

(22) Filed: Nov. 30, 2021

(65) Prior Publication Data

US 2022/0198805 A1 Jun. 23, 2022

(30) Foreign Application Priority Data

Dec. 23, 2020 (JP) ................. 2020-214292

(51) Int. Cl.
| | |
|---|---|
| *G01J 5/00* | (2022.01) |
| *G06V 20/54* | (2022.01) |
| *G06V 20/17* | (2022.01) |
| *G06V 40/10* | (2022.01) |
| *G06V 10/20* | (2022.01) |
| *H04N 5/33* | (2023.01) |

(Continued)

(52) U.S. Cl.
CPC ............ *G06V 20/54* (2022.01); *B64C 39/024* (2013.01); *G01J 5/0025* (2013.01); *G06V 10/255* (2022.01); *G06V 20/17* (2022.01); *G06V 40/103* (2022.01); *H04N 5/33* (2013.01); *B64U 2101/30* (2023.01); *G06V 2201/08* (2022.01)

(58) Field of Classification Search
CPC ...... G06V 20/54; G06V 20/17; G06V 10/255; G06V 40/103; G06V 2201/08; B64C 39/024; G01J 5/0025; G01J 2005/0077; H04N 5/33; H04N 7/18; H04N 23/57; B64U 2101/30; G08B 25/00
See application file for complete search history.

(56) References Cited

U.S. PATENT DOCUMENTS

| | | | |
|---|---|---|---|
| 10,102,586 B1 * | 10/2018 | Marlow | ............... B64C 39/024 |
| 2020/0142419 A1 * | 5/2020 | Pohl | .................... G05D 1/0278 |

(Continued)

FOREIGN PATENT DOCUMENTS

JP 2003-162784 A 6/2003

OTHER PUBLICATIONS

Stuparu D et al, Vehicle Detection in Overhead Satellite Images Using a One-Stage Object Detection Model, 2020, Sensors, 20: 6485; pp. 1-18. (Year: 2020).*

(Continued)

*Primary Examiner* — John Villecco
*Assistant Examiner* — Kathleen M Broughton
(74) *Attorney, Agent, or Firm* — Oliff PLC

(57) ABSTRACT

A server includes a control unit. The control unit determines whether a parked vehicle is used as a shelter based on a first image which is included in an image captured by a camera and which is obtained by imaging the vehicle and surroundings of the vehicle.

17 Claims, 9 Drawing Sheets

(51) Int. Cl.
    *B64C 39/02*    (2023.01)
    *B64U 101/30*    (2023.01)

(56) References Cited

U.S. PATENT DOCUMENTS

2020/0150662 A1*   5/2020   Zhou ..................... H04N 23/63
2020/0346751 A1*  11/2020  Horelik ................. B64U 10/13

OTHER PUBLICATIONS

Lin L et al, Hierarchical Heuristic Search Using a Gaussian Mixture Model for UAV Coverage Planning, 2014, IEEE Transactions on Cybernetics, 44:12. pp. 2532-2544. (Year: 2014).*
Gotovac S et al, Analysis of Saliency Object Detection Algorithms for Search and Rescue Operations, 2016, IEEE International Conference on Software, Telecommunications and Computer Networks, pp. 1-14. (Year: 2016).*
Gotovac et al, Analysis of saliency object detection algorithms for search and rescue operations, 2016, IEEE 2016 International Conference on Software, Telecommunications and Computer Networks, Sep. 2016, pp. 1-6. (Year: 2016).*
De Alcantara Andrade et al., Autonomous Unmanned Aerial Vehicles in Search and Rescue Missions Using Real-Time Cooperative Model Predictive Control, 2019, Sensors (19) 4067: 1-22. (Year: 2019).*
Rodin et al, Object Classification in Thermal Images using Convolutional Neural Networks for Search and Rescue Missions with Unmanned Aerial Systems, 2018, 2018 International Joint Conference on Neural Networks, Jul. 2018, pp. 1-8. (Year: 2018).*

* cited by examiner

SERVER, VEHICLE DETECTION SYSTEM, AND VEHICLE DETECTION METHOD

CROSS-REFERENCE TO RELATED APPLICATION

This application claims priority to Japanese Patent Application No. 2020-214292 filed on Dec. 23, 2020, incorporated herein by reference in its entirety.

BACKGROUND

1. Technical Field

The disclosure relates to a server, a vehicle detection system, and a vehicle detection method that can detect a vehicle which is used as a vehicular shelter in disasters.

2. Description of Related Art

Recently, natural disasters such as earthquakes and typhoons have frequently occurred. It is preferable that governments, local governments, civic organizations that support victims, and the like be able to appropriately support victims of natural disasters. Therefore, a system that receives earthquake damage information at the time of occurrence of an earthquake and notifies of an appropriate emergency evacuation map to shelters for each district has been proposed (for example, see Japanese Unexamined Patent Application Publication No. 2003-162784 (JP 2003-162784 A)).

SUMMARY

Because of a problem with privacy, anxiety about infectious diseases, a problem with rules of shelters such as pets not being allowed, and the like, there are persons who use vehicles such as private cars as shelters without using public shelters. It is preferable that relief supplies and appropriate information be provided to evacuees. However, governments, local governments, civic organizations, and the like have difficulty ascertaining evacuees in vehicular shelters.

The disclosure provides a server, a vehicle detection system, and a vehicle detection method that can detect a vehicle which is used as a shelter at the time of occurrence of a disaster.

A server according to the present disclosure includes a control unit. The control unit is configured to calculate whether a parked vehicle is used as a shelter based on a first image which is included in an image captured by a camera and which is obtained by imaging the vehicle and surroundings of the vehicle.

A vehicle detection system according to the present disclosure includes a mobile object that includes a camera and a server that is able to communicate with the mobile object. The server includes a control unit configured to determine whether a parked vehicle is used as a shelter based on a first image which is included in an image captured by the camera and which is obtained by imaging the vehicle and surroundings of the vehicle.

A vehicle detection method according to the present disclosure includes causing a control unit to determine whether a parked vehicle is used as a shelter based on a first image which is included in an image captured by a camera and which is obtained by imaging the vehicle and surroundings of the vehicle.

According to the present disclosure, it is possible to provide a server, a vehicle detection system, and a vehicle detection method that can detect a vehicle which is used as a shelter at the time of disaster.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
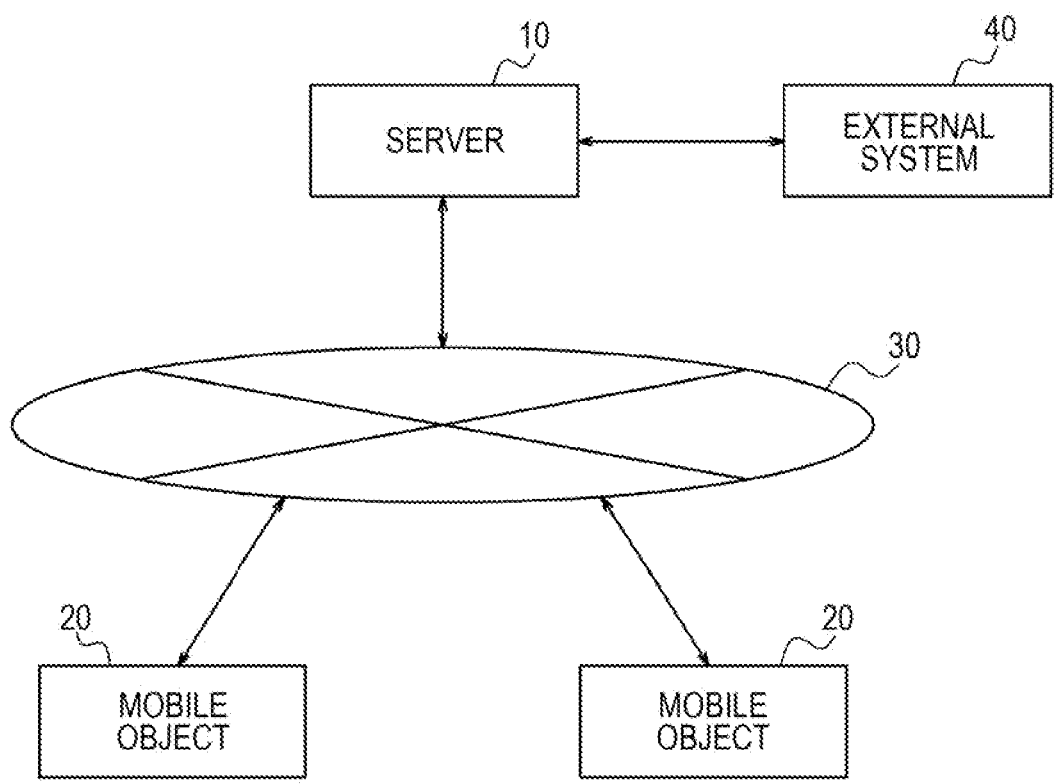
FIG. 1 is a block diagram schematically illustrating a configuration of a vehicle detection system according to an embodiment of the present disclosure.

Hereinafter, an embodiment of the present disclosure will be described with reference to the accompanying drawings. The diagrams used in the following description are schematically illustrated. Dimensional ratios and the like in the drawings do not match actual ratios and the like.

Configuration of Vehicle Detection System

A vehicle detection system 1 according to an embodiment of the present disclosure includes a server 10 and one or more mobile objects 20 as illustrated in FIG. 1. The vehicle detection system 1 can be operated by a service provider for a vehicle. The vehicle detection system 1 may be operated by a public organization such as a local government. The server 10 and the mobile objects 20 are configured to communicate with each other via a network 30. The network 30 may include various communication networks such as a public network and a dedicated network.

The server 10 can set a moving route for the mobile object 20. Examples of the mobile object 20 include an unmanned aircraft, a vehicle, and a robot which can autonomously move along the set moving route. The unmanned aircraft may be a so-called drone. In the following description, it is assumed that the mobile object 20 is an unmanned aircraft. The mobile object 20 includes a camera and can capture an image of a vehicle and surroundings thereof.

The server 10 can acquire an image captured by the mobile object 20. The server 10 can identify a vehicle which is used as a shelter at the time of occurrence of a disaster based on the acquired image. When the vehicle detection system 1 is operated by a service provider, the server 10 can provide information of a vehicle which is used as a shelter to an external system 40 provided in a local government or the like. Elements of the vehicle detection system 1 will be described below in more detail.

Configuration of Server

Figure 2:
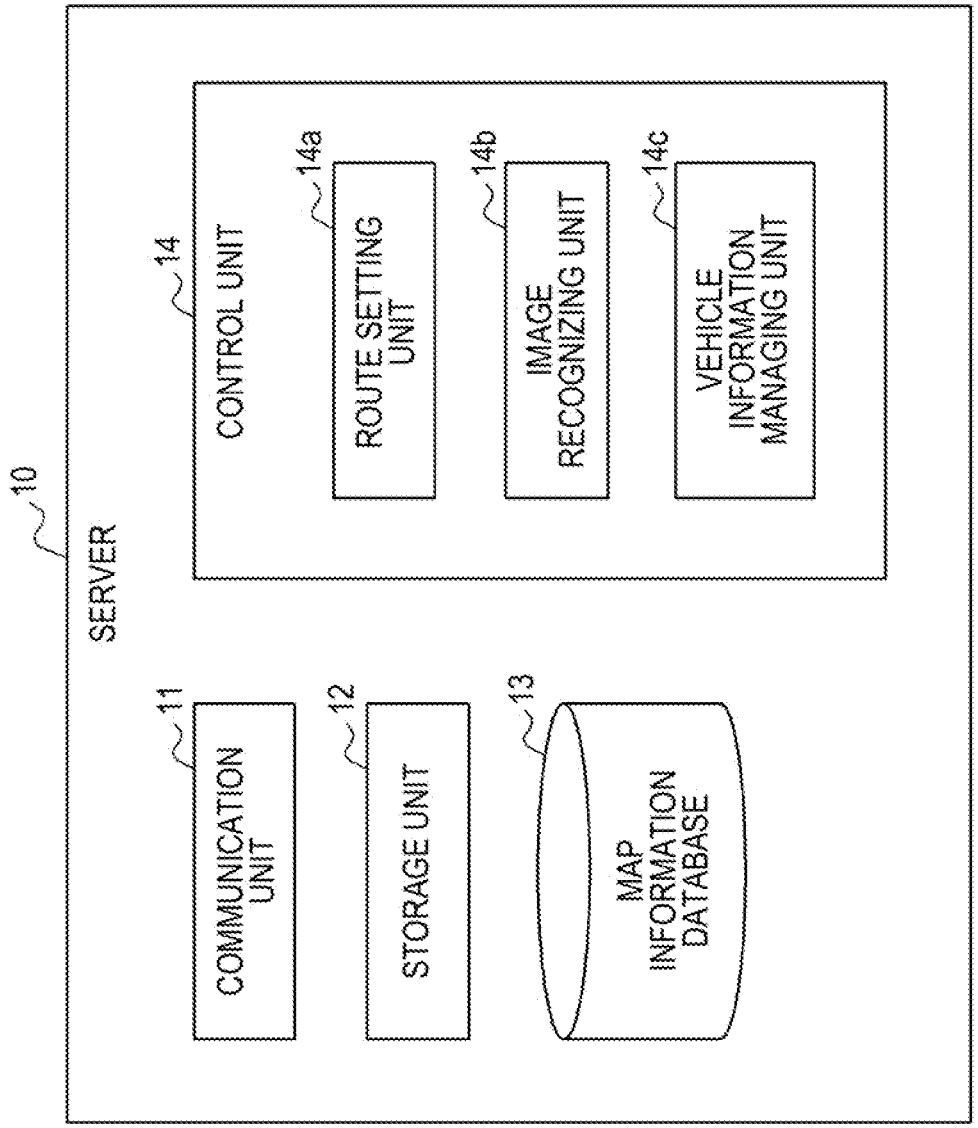
FIG. 2 is a block diagram schematically illustrating a configuration of a server illustrated in FIG. 1.

The server 10 according to the embodiment includes a communication unit 11, a storage unit 12, a map information database 13, and a control unit 14 as illustrated in FIG. 2.

The communication unit 11 includes a communication interface that is connected to a network 30 in a wired or wireless manner. The communication unit 11 performs a protocol process associated with transmission and reception of information and processes such as modulation of a transmission signal and demodulation of a reception signal. The communication unit 11 can transmit and receive information to and from the mobile object 20 via the network 30. The communication unit 11 can be rewritten as a communicator.

The storage unit 12 stores information and programs required for processes which are performed by the control unit 14. The storage unit 12 may include one or more of a semiconductor storage device, a magnetic storage device, and an optical storage device. Examples of the semiconductor storage device include a dynamic random access memory (DRAM), a static random access memory (SRAM), and a flash memory. Examples of the magnetic storage device include a magnetic tape, a floppy (registered trademark) disk, and a hard disk. Examples of the optical storage device include a compact disc (CD), a digital versatile disc (DVD), and a Blu-ray (registered trademark). The storage unit 12 stores information of a vehicle which is detected by the mobile object 20 along with an evaluation value. The information of a vehicle includes position information of the vehicle. The information of a vehicle may further include identification information of the vehicle. The evaluation value represents a degree to which the vehicle is used as a vehicular shelter.

The map information database 13 is a database in which map information of an entire area in which the mobile objects 20 fly is stored. The map information database 13 includes three-dimensional terrain information. The map information database 13 includes position information of roads and principal facilities such as parking lots, schools, public facilities, and designated shelters at the time of occurrence of a disaster. The map information database 13 may be included in the storage unit 12.

The control unit 14 includes one or more processors. The processors include a general-purpose processor that performs programmed functions by reading a specific program and a dedicated processor that is specialized for specific processes. A digital signal processor (DSP), an application-specific integrated circuit (ASIC), a field-programmable gate array (FPGA), or the like can be employed as the dedicated processor. The control unit 14 may include a memory that can store programs which are executed by the processor, information which is used for arithmetic operations of the processor, and the like.

The control unit 14 controls the constituents of the server 10. The control unit 14 can transmit and receive information to and from each mobile object 20 via the communication unit 11. The control unit 14 can write and read information to and from the storage unit 12. The control unit 14 can read map information from the map information database 13.

The control unit 14 includes a route setting unit 14a, an image recognizing unit 14b, and a vehicle information managing unit 14c as functional blocks. Each functional block may be mounted as a hardware module or a software module. The functional blocks such as the route setting unit 14a, the image recognizing unit 14b, and the vehicle information managing unit 14c can be combined and rearranged. Processes which are performed by the functional units such as the route setting unit 14a, the image recognizing unit 14b, and the vehicle information managing unit 14c can be rewritten as being performed by the control unit 14.

The route setting unit 14a sets a route along which each mobile object 20 moves. When there is a plurality of mobile objects 20, the route setting unit 14a sets the moving route such that the whole target area is covered with the routes of the plurality of mobile objects 20. The route setting unit 14a transmits the moving route to the corresponding mobile object 20 via the communication unit 11. The route setting unit 14a may acquire map information associated with the moving route from the map information database 13 and transmit the acquired map information along with the moving route to the corresponding mobile object 20. The mobile object 20 having received the moving route starts detection of a vehicle along the moving route. The route setting unit 14a may instruct the mobile object 20 to detect a vehicle by transmitting the moving route to the mobile object 20 regularly or irregularly a plurality of times a day.

The image recognizing unit 14b acquires an image (a first image) which is captured by the mobile object 20 via the communication unit 11. The image captured by the mobile object 20 includes an image of a vehicle and surroundings of the vehicle. The image recognizing unit 14b performs a recognition process on the image captured by the mobile object 20. The image recognizing unit 14b determines whether the vehicle is used as a shelter based on the result of the recognition process. Determining whether the vehicle is used as a shelter includes performing an operation of evaluating a likelihood that the vehicle is used as a shelter. The image recognizing unit 14b may generate an evaluation value indicating the likelihood that the vehicle is used as a shelter.

The evaluation value can be expressed in various modes. For example, the evaluation value may represent the likelihood that the vehicle is used as a shelter as a score. In this case, a higher score means that there is a higher likelihood that the vehicle is used as a shelter. The evaluation value may represent the likelihood that the vehicle is used as a shelter as a ratio. A ratio can be estimated by accumulating information of actual results at the time of actual disasters. Alternatively, the evaluation value may represent a case in which there is a likelihood that the vehicle is used as a shelter and a case in which there is no likelihood that the vehicle is used as a shelter as binary values such as "0" and "1."

The image recognizing unit 14b can identify a position of the vehicle based on the position information of the mobile object 20 received from the mobile object 20, the position of the vehicle in the image, and the map information stored in the map information database 13.

The vehicle information managing unit 14c manages information of a parked vehicle detected by the mobile object 20. The vehicle information managing unit 14c may store the detected position of the vehicle and the evaluation value representing the likelihood that the vehicle is used as a shelter in the storage unit 12 in correlation with each other. The vehicle information managing unit 14c may store the identification information of the vehicle in the storage unit 12. The vehicle information managing unit 14c can add, change, read, and the like information of the parked vehicle according to necessity.

Configuration of Mobile Object

Figure 3:
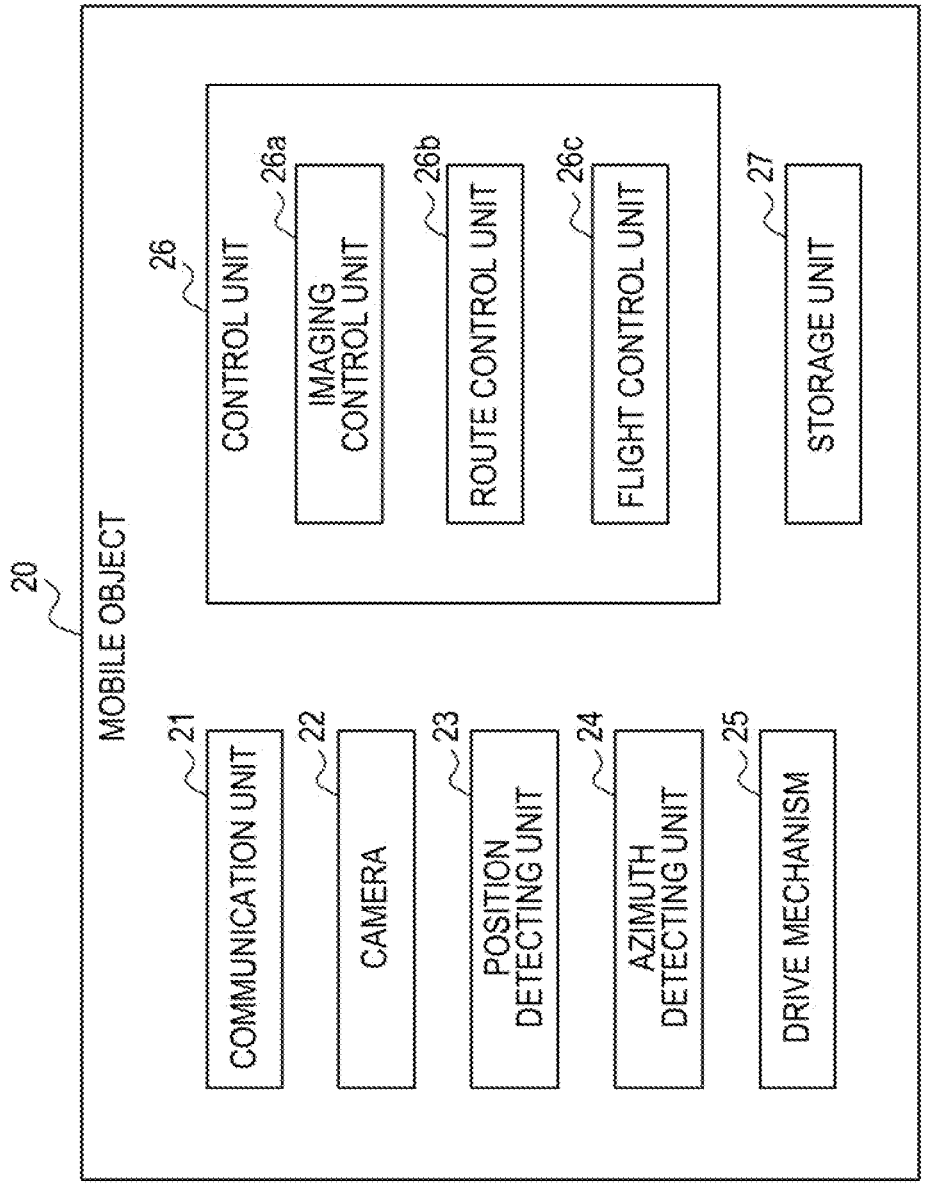
FIG. 3 is a block diagram schematically illustrating a configuration of a mobile object illustrated in FIG. 1.

As illustrated in FIG. 3, a mobile object 20 according to the embodiment includes a communication unit 21, a camera 22, a position detecting unit 23, an azimuth detecting unit 24, a drive mechanism 25, a control unit 26, and a storage unit 27. For example, the mobile object 20 is an unmanned aircraft that receives an instruction of a flight route from the server 10 and flies at least partially autonomously.

The communication unit 21 is a communication interface that is connected to the network 30 in a wireless manner. The communication unit 21 may correspond to radio communication such as a 4th generation mobile communication system (4G) such as Long Term Evolution (LTE), a 5th generation mobile communication system (5G), and Wi-Fi (registered trademark). The communication unit 21 performs a protocol process associated with transmission and reception of information and processes such as modulation of a transmission signal and demodulation of a reception signal. The communication unit 21 can transmit and receive information to and from the server 10 via the network 30. The communication unit 21 can be rewritten as a radio communicator.

The camera 22 includes an optical system such as a lens and an imaging device such as a charge-coupled device (CCD) image sensor or a complementary MOS (CMOS) image sensor. The camera 22 may perform a demosaicing process, a noise reducing process, a white balance adjusting process, an exposure adjusting process, a distortion correcting process, and the like on an image signal output from the imaging device. The camera 22 may include an image signal processor (ISP) that performs such signal processing.

The camera 22 mounted in the mobile object 20 can capture an image of surroundings of the mobile object 20. When the mobile object 20 is an unmanned aircraft, the camera 22 may be provided on the bottom of the mobile object 20 to image a subject on a ground surface. The camera 22 may be a wide-angle camera. For example, the camera 22 may be a camera that can image a lower hemisphere in 360 degrees. The camera 22 consecutively captures an image at a predetermined frame rate, for example, 30 frames per second (fps). The camera 22 may output a signal of the captured image to the control unit 26.

The mobile object 20 may include a plurality of cameras 22. The plurality of cameras 22 may have different imaging ranges. One of the plurality of cameras may be a camera that can image the lower hemisphere in 360 degrees. Another of the plurality of cameras may be a camera that can capture an image in a specific direction. The plurality of cameras 22 may include a far-infrared camera.

The position detecting unit 23 is a sensor that detects a current position of the mobile object 20. The position detecting unit 23 can detect an absolute position which is expressed by latitude and longitude or the like. The position detecting unit 23 can include a receiver corresponding to a global navigation satellite system (GNSS). An example of the receiver corresponding to the GNSS is a Global Positioning System (GPS) receiver. The position detecting unit 23 can be rewritten as a positioning sensor.

The azimuth detecting unit 24 is a sensor that detects an azimuth. The azimuth detecting unit 24 can measure an azimuth, for example, by detecting a geomagnetic force. The azimuth detecting unit 24 can be rewritten as an azimuth sensor.

The drive mechanism 25 is a mechanism that is used to move the mobile object 20. When the mobile object 20 is an unmanned aircraft, the drive mechanism 25 includes a plurality of rotors and drive devices thereof. The number of rotors may be, for example, four, six, or eight, but is not limited thereto. For example, the plurality of rotors is arranged radially in a horizontal plane from the body center of the mobile object 20. The drive mechanism 25 can cause the mobile object 20 to perform various motions such as stop, ascent, descent, forward movement, rearward movement, and turn by adjusting rotation speeds of the rotors under the control of a flight control unit 26c of the control unit 26.

The control unit 26 includes one or more processors. Similarly to the control unit 14 of the server 10, the control unit 26 includes various processors and a memory. The control unit 26 controls the constituents and the whole body of the mobile object 20. The control unit 26 may include, for example, an imaging control unit 26a, a route control unit 26b, and a flight control unit 26c as functional blocks. Each of the functional blocks such as the imaging control unit 26a, the route control unit 26b, and the flight control unit 26c may be mounted as a hardware module or a software module. The functional blocks such as the imaging control unit 26a, the route control unit 26b, and the flight control unit 26c can combined and rearranged. Processes which are performed by the functional blocks such as the route control unit 26b and the flight control unit 26c can be rewritten as being performed by the control unit 26.

The imaging control unit 26a controls the camera 22. The imaging control unit 26a transmits an image acquired from the camera 22 to the server 10 via the communication unit 21. The imaging control unit 26a can transmit position information detected by the position detecting unit 23 along with the image to the server 10. The imaging control unit 26a may image a recognized vehicle at a predetermined distance in a predetermined direction in accordance with an instruction received from the server 10 via the communication unit 21. Accordingly, the imaging control unit 26a can cooperate with the route control unit 26b and the flight control unit 26c.

The route control unit 26b acquires a moving route and map information associated with the moving route from the server 10 via the communication unit 21. The route control unit 26b may store the moving route and the map information in the storage unit 27. The route control unit 26b moves the mobile object 20 along the set moving route. When a vehicle near the moving route has been detected, the route control unit 26b may control the drive mechanism 25 such that the mobile object 20 moves at a predetermined distance in a predetermined direction with respect to the vehicle in order to determine whether the vehicle is used as a shelter.

The flight control unit 26c controls the drive mechanism 25 of the mobile object 20 such that a flight state is autonomously maintained. For example, the flight control unit 26c keeps a distance from a ground surface at a predetermined distance. When the position of the mobile object 20 departs from the moving route due to an external factor such as wind, the flight control unit 26c controls the drive mechanism 25 such that the mobile object 20 returns to the moving route. When an unexpected obstacle is detected, the flight control unit 26c may control the drive mechanism 25 such that the obstacle is avoided. For the purpose of use in control of the flight control unit 26c, the mobile object 20 may include various sensors in addition to the position detecting unit 23 and the azimuth detecting unit 24. For example, the mobile object 20 may include an acceleration sensor, an angular velocity sensor, a terrain clearance indicator, and an obstacle sensor.

The storage unit 27 stores data and programs required for processes which are performed by the control unit 26. For example, the storage unit 27 stores the moving route and the map information received from the server 10. Similarly to the storage unit 12 of the server 10, the storage unit 27 may include one or more of a semiconductor storage device, a magnetic storage device, and an optical storage device.

Examples of Application

Figure 4:
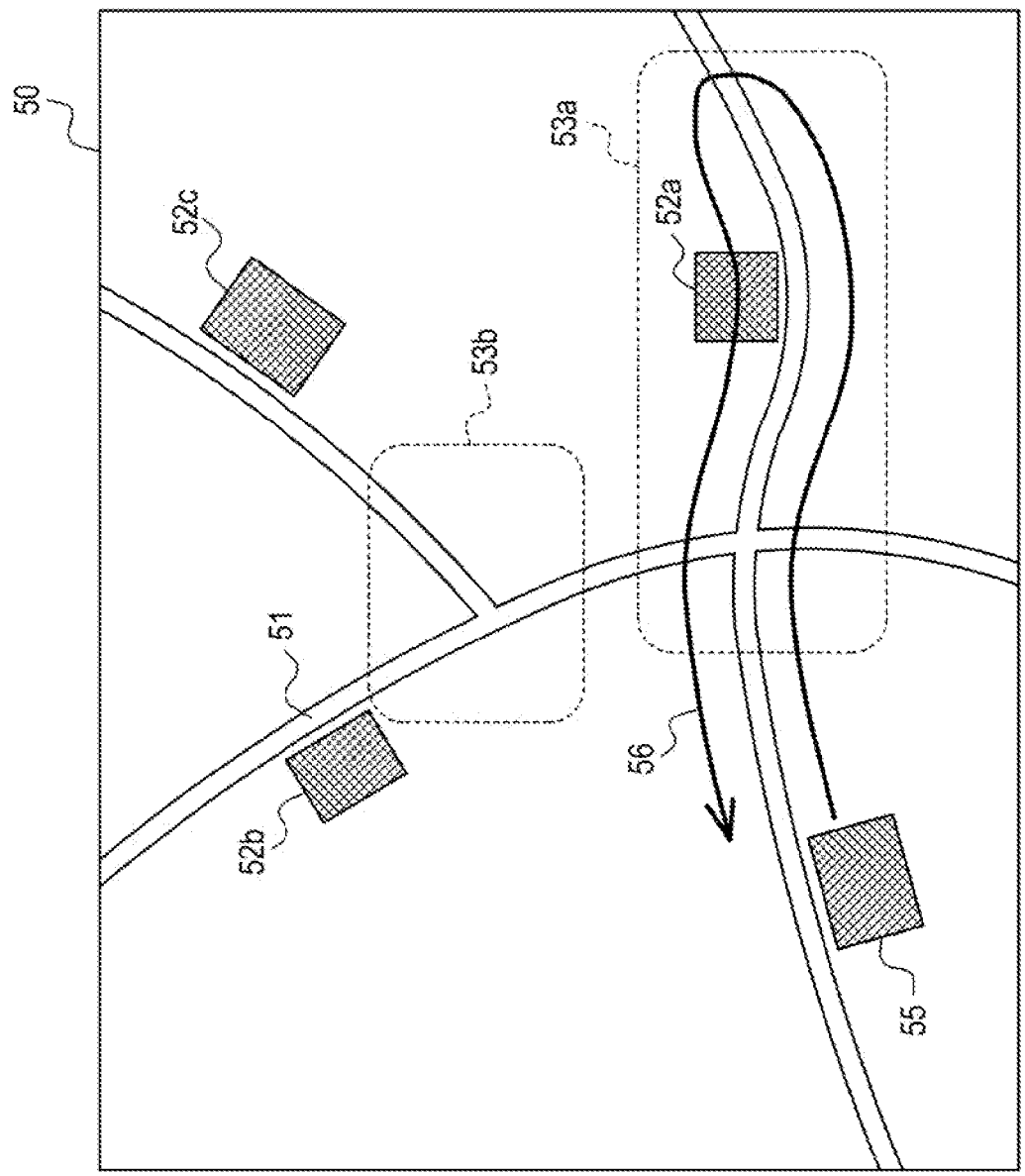
FIG. 4 is a diagram illustrating an example of an area which is searched for a vehicle.

Operation examples of the vehicle detection system 1 will be described below with reference to FIGS. 4 to 6. FIG. 4 illustrates a simplified map 50 indicating an example of an area in which a vehicle which is used as a shelter is searched for. The map 50 includes a road 51, parking lots 52*a* to 52*c*, and residential areas 53*a* and 53*b* for residents. The parking lots 52*a* to 52*c* include parking lots of a large facility such as a public facility such as a city hall or a shopping center and parking lots of a designated shelter. It is assumed that the parking lots 52*a* to 52*c* include empty lots which can be used as parking lots. The residential areas 53*a* and 53*b* include an urban district, a residential section, or the like in which many residents live.

In FIG. 4, the mobile object 20 is disposed in a mobile object station 55. The server 10 may be located at any place including the mobile object station 55. The server 10 sets a moving route 56 along which the mobile object 20 moves through one or more the parking lots 52*a* to 52*c* and the residential areas 53*a* and 53*b* and returns to the mobile object station 55 for each mobile object 20. When the mobile object 20 is an unmanned aircraft, the mobile object 20 flies in the sky. The mobile object 20 can fly, for example, at the altitude of 3 m to 150 m from the ground surface, but is not limited thereto. In the example illustrated in FIG. 4, a moving route passing through the parking lot 52*a* and the residential area 53*a* is assigned to one mobile object 20. The parking lots 52*b* and 52*c* and the residential area 53*b* can be covered by a moving route of another mobile object 20.

Figure 5:
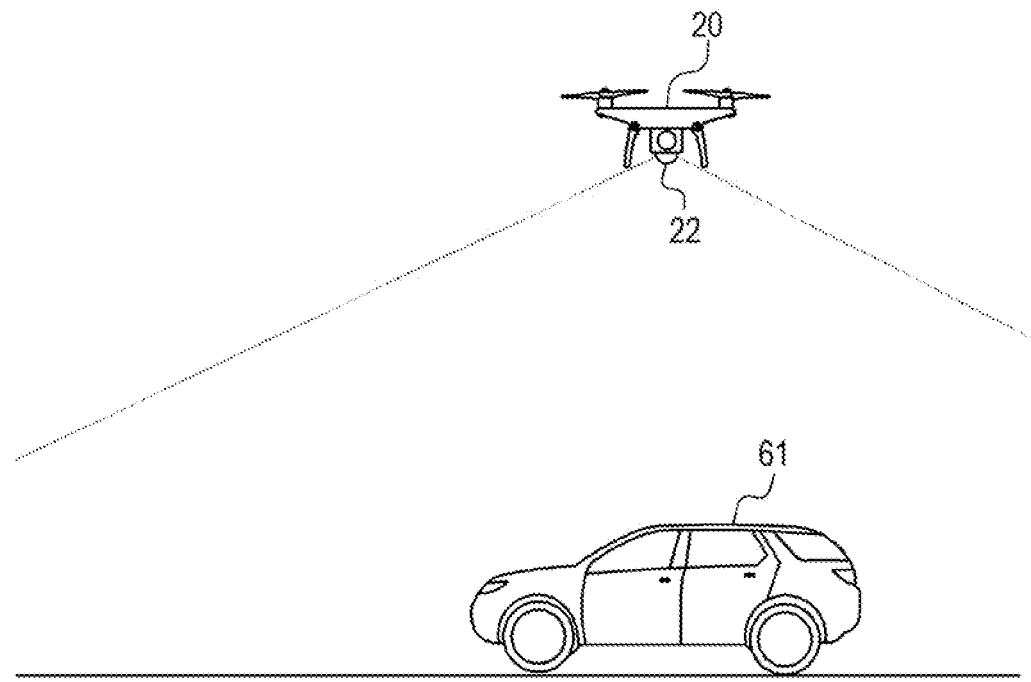
FIG. 5 is a diagram illustrating an example in which a vehicle is detected by a mobile object.

As illustrated in FIG. 5, the mobile object 20 images a vehicle 61 located on the ground surface using a camera 22 facing the ground surface. The mobile object 20 can capture an image including a plurality of vehicles 61 at the same time. The image captured by the mobile object 20 is transmitted to the server 10 via the network 30. The control unit 14 of the server 10 detects a vehicle 61 from the received image. Detection of a vehicle 61 can be performed using an image processing method such as template matching.

Figure 6:
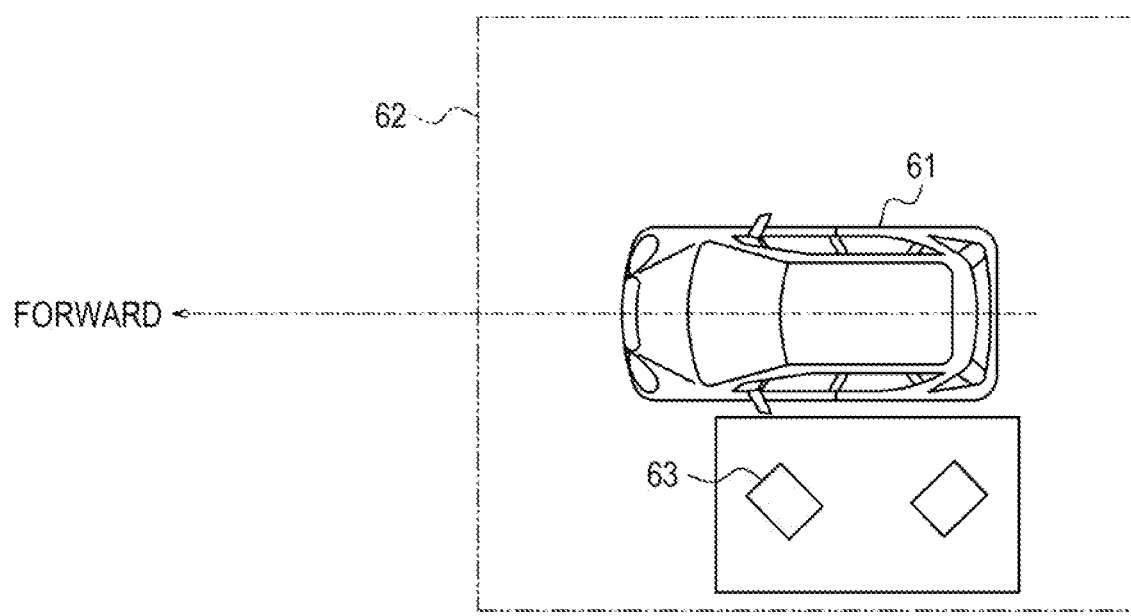
FIG. 6 is a diagram illustrating a vehicle detection method using an image which is obtained by imaging a vehicle and surroundings of the vehicle.

As illustrated in FIG. 6, the control unit 14 of the server 10 performs a recognition process on an image (a first image) including a vehicle 61 and a nearby area 62 of the vehicle 61 in the image captured by the camera 22. The nearby area 62 of the vehicle 61 can be set to, for example, a range within about 3 m from the vehicle 61, but is not limited thereto. The control unit 14 detects articles 63 located in the nearby area 62 of the vehicle 61. The control unit 14 analyzes whether a predetermined article 63 is included in the nearby area 62. Examples of the predetermined article 63 include a tent, a chair, a table, an article of clothing (laundry), and a ground sheet. In the example illustrated in FIG. 6, the article 63 is a chair which is placed like a ground sheet. When the vehicle 61 is used as a shelter, such an article 63 is often placed near the vehicle 61. Accordingly, when it is recognized that such an article 63 is included in the image, the control unit 14 can evaluate that there is a higher likelihood that the vehicle 61 is used as a shelter in comparison with a case in which such an article 63 is not included in the image.

The control unit 14 of the server 10 may evaluate whether the vehicle 61 is used as a shelter based on an image of the vehicle 61. For example, the control unit 14 may recognize states of doors and windows of the vehicle 61 from the image captured by the camera 22. For example, when it is recognized that a window or door of the vehicle 61 is open, the control unit 14 can evaluate that there is a higher likelihood that the vehicle 61 is used as a shelter in comparison with a case in which it is recognized that a window or door of the vehicle 61 is not open.

When it is recognized that a person is in the vehicle 61 in the image captured by the camera 22, the control unit 14 can evaluate that there is a higher likelihood that the vehicle 61 is used as a shelter in comparison with a case in which it is recognized that a person is not in the vehicle 61. For example, the control unit 14 may detect a head of a person in the vehicle 61 by template matching. Alternatively, when there is a moving subject in the vehicle 61, the control unit 14 may determine that the subject is a person.

When it is recognized that a member for preventing the inside from being viewed from the outside of the vehicle 61 is provided in a window of the vehicle 61 in the image, the control unit 14 may evaluate that there is a higher likelihood that the vehicle 61 is used as a shelter in comparison with a case in which the member is not recognized. The member for preventing the inside from being viewed from the outside is, for example, a light-blocking shade or a curtain. Such a member may be used for privacy protection when a person is in a vehicle 61.

The control unit 14 of the server 10 may instruct the mobile object 20 to move a distance within a predetermined range and/or in a predetermined direction relative to the vehicle 61 in order to acquire desired information from the image of the vehicle 61. The control unit 14 may determine the direction of the vehicle 61 from an image which is obtained by imaging the vehicle 61 from up. For example, the control unit 14 may instruct the mobile object 20 to capture an image of the vehicle 61 from the forward of the vehicle 61. In this case, the camera 22 can capture, for example, an image of the front of the vehicle 61 including a number plate. Accordingly, the server 10 can acquire information of the number plate as identification information of the vehicle 61. Appearance information such as the size and the color of the vehicle 61 which are recognized from the image may be used as the identification information.

When the camera 22 includes a far-infrared camera, the control unit 14 of the server 10 can measure temperature information of a subject from an image captured by the camera 22. For example, when a person takes refuge in the vehicle and thus the inside of the vehicle 61 is heated or cooled, the temperature of a window part of the vehicle 61 may be different from that of the surroundings. When a parked vehicle 61 operates an engine thereof for cooling or heating, the temperature of a part close to the engine of the vehicle 61 is higher than that of the surroundings. The control unit 14 can detect a temperature distribution from the image captured by the far-infrared camera and evaluate that there is a higher likelihood that the vehicle 61 is used as a shelter when at least a part of the vehicle 61 is different in temperature from the surroundings in comparison with an otherwise case.

The control unit 14 of the server 10 determines whether the vehicle 61 is used as a shelter in consideration of various conditions described above. The control unit 14 can evaluate a likelihood that the vehicle 61 is used as a shelter. The control unit 14 may output an evaluation value obtained by scoring the likelihood that the vehicle 61 is used as a shelter based on the various conditions described above. When the evaluation value is higher than a predetermined value, the control unit 14 may determine that there is a high likelihood that the vehicle 61 is used as a shelter.

The control unit 14 may store a parking position and identification information of the vehicle 61 along with the evaluation value in the storage unit 12. The control unit 14 can transmit position information and identification information of a vehicle 61 which is determined to have a high likelihood that it is used as a shelter to the external system 40 according to necessity.

Vehicle Detection Method 1

An example of a vehicle detection method according to the present disclosure which is performed by the control unit 14 of the server 10 will be described below with reference to FIG. 7.

First, the control unit 14 sets a moving route of a mobile object 20 via the network 30 (Step S101).

The mobile object 20 of which the moving route has been set sequentially transmits a captured image to the server 10 while moving along the moving route. The control unit 14 searches for a vehicle 61 from the received image (Step S102).

When a vehicle 61 is recognized from the image received from the mobile object 20 (Step S103: YES), the control unit 14 performs the process of Step S104. When a vehicle 61 is not recognized from the image received from the mobile object 20 (Step S103: NO), the control unit 14 performs the process of Step S107.

The control unit 14 identifies a position of the recognized vehicle 61 based on the image captured by the mobile object 20, position information of the mobile object 20 received from the mobile object 20, and map information (Step S104). The control unit 14 can identify the position of the vehicle 61 by correlating a road 51, a parking lot 52, and the like in the image with positions thereof on the map information. When the mobile object 20 flies just above the vehicle 61 or when the mobile object 20 flies near the vehicle 61, the control unit 14 can use the position information of the mobile object 20 as position information of the vehicle 61.

Figure 8:
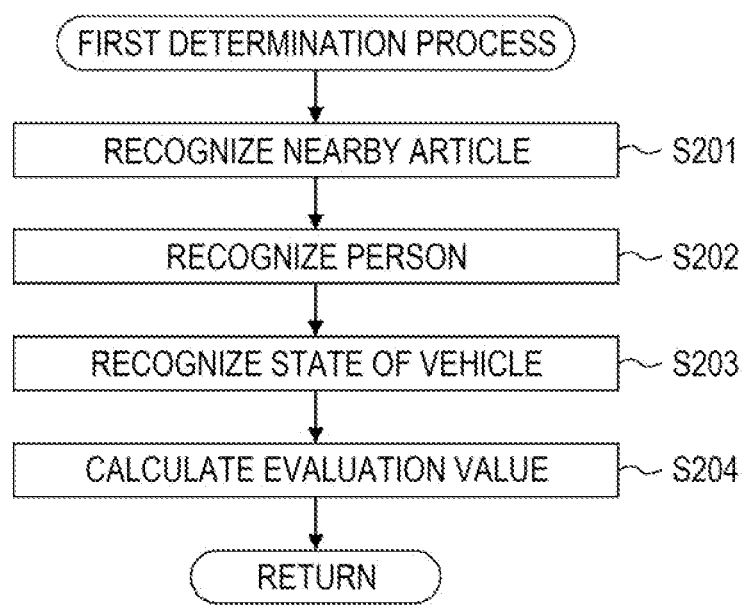
FIG. 8 is a flowchart illustrating a first determination process illustrated in FIG. 7.

The control unit 14 performs a first determination process of determining a likelihood that the vehicle 61 is used as a shelter based on the image acquired from the mobile object 20 (Step S105). An example of the first determination process will be described below with reference to FIG. 8.

The control unit 14 recognizes a predetermined article 63 located in a nearby area 62 of the vehicle 61 from an image obtained by imaging the vehicle 61 and the nearby area 62 (Step S201). The predetermined article 63 is an article indicating that there is a likelihood that the vehicle 61 is used as a shelter as described above.

Then, the control unit 14 recognizes a person in the vehicle 61 based on the image acquired from the mobile object 20 (Step S202). When the vehicle 61 is stopped and a person is in the vehicle 61, there is a likelihood that the vehicle 61 is used as a shelter. When a person is in the nearby area 62 of the vehicle 61, not in the vehicle 61, the control unit 14 can also consider it as information indicating that there is a likelihood that the vehicle 61 is used as a shelter.

The control unit 14 recognizes a state of the vehicle 61 based on the image acquired from the mobile object 20 (Step S203). The state of the vehicle 61 may include at least one of an open/closed state of a window or a door, arrangement of a member for preventing the inside from being viewed from the outside of the vehicle such as a shade, and a temperature distribution of the vehicle 61.

In order to perform the processes of Steps S201 to S203, the control unit 14 may instruct the mobile object 20 to capture an image at a specific distance in a specific direction. The control unit 14 may not perform all the processes of Steps S201 to S203. The control unit 14 may perform one or more of the processes of Steps S201 to S203.

After performing one or more of the processes of Steps S201 to S203, the control unit 14 calculates an evaluation value indicating the likelihood that the vehicle 61 is used as a shelter (Step S204). The control unit 14 may calculate the evaluation value by scoring the results of recognition in Steps S201 to S203 and performing a predetermined arithmetic operation thereon. Alternatively, the control unit 14 may determine whether the likelihood that the vehicle 61 is used as a shelter is high or low based on the results of recognition in Steps S201 to S203. In this case, for example, the evaluation value when there is a high likelihood can be set to "1," and the evaluation value when there is a low likelihood can be set to "0."

The control unit 14 may consider the position of the vehicle 61 in calculating the evaluation value. For example, when the vehicle 61 is located in a parking lot 52 of a designated shelter at the time of occurrence of a disaster or when the vehicle 61 is located in a predetermined distance range from the designated shelter, the control unit 14 may evaluate that the likelihood that the vehicle 61 is used as a shelter is higher. Near the designated shelter, an evacuee who does not lodge in the shelter but desires support of refuge for reasons of rules of the shelter, privacy, and the like may park the vehicle 61 and take refuge in the vehicle 61.

Figure 7:
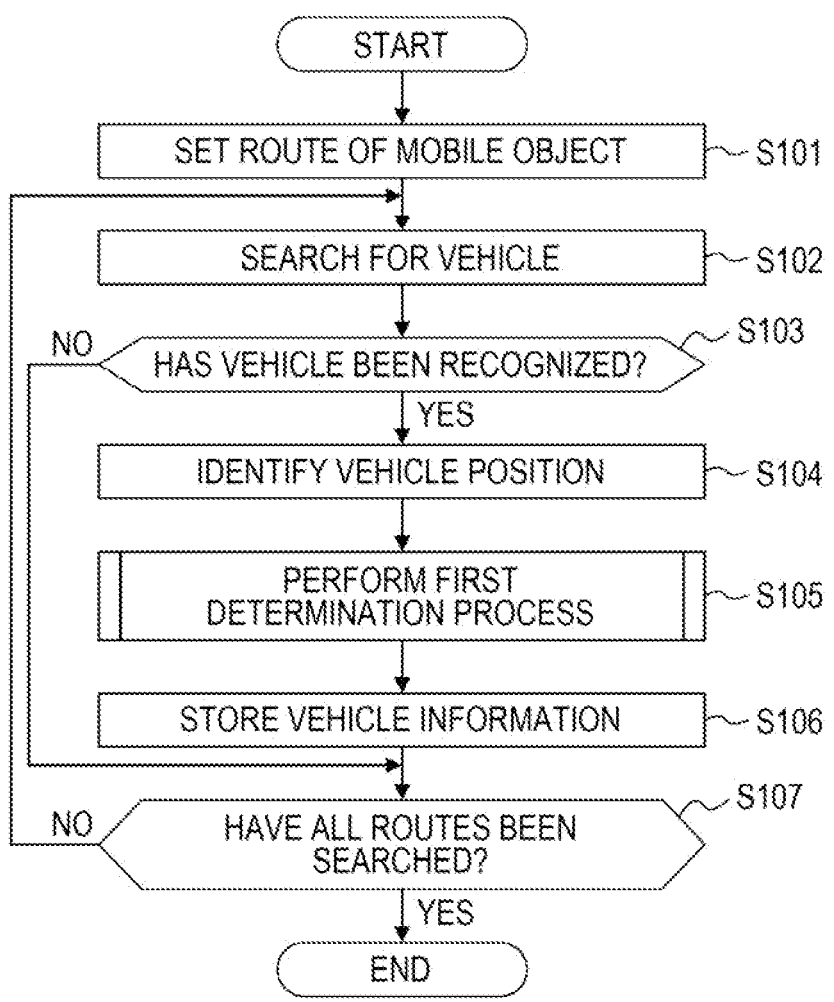
FIG. 7 is a flowchart illustrating a vehicle detection method according to an embodiment.

After Step S204, the control unit 14 performs the process of Step S106 in FIG. 7. The control unit 14 stores the position information and the evaluation value of the recognized vehicle 61 in the storage unit 12. The control unit 14 may store the identification information of the vehicle 61.

Until the mobile objects 20 move along all the moving routes 56 and the control unit 14 of the server 10 searches for vehicles 61 on all the moving routes 56 (Step S107: NO), the control unit 14 repeatedly performs the processes of Steps S102 to S106. When the mobile objects 20 move along all the moving routes 56 and the control unit 14 completes search for vehicles 61 on all the moving routes 56 (Step S107: YES), the process of detecting a vehicle 61 ends.

The control unit 14 of the server 10 may extract a vehicle 61 of which the evaluation value is higher than a predetermined value from vehicle information stored in the storage unit 12 at an appropriate timing and transmits vehicle identification information thereof along with the position information of the vehicle 61 to the external system 40. Alternatively, the server 10 may output such information to an output device such as a display or a printer. A local government, a support organization, or the like having received such information can determine that there is a likelihood that such a vehicle 61 is used as a shelter by an evacuee in a disaster and perform support the evacuee.

Vehicle Detection Method 2

The server 10 may repeatedly cause a mobile object 20 to regularly or irregularly detect a vehicle 61 that is used as a shelter. In this case, the server 10 may acquire an image of the same place as a place at which the vehicle 61 was detected in the past from the mobile object 20. A result of determination indicating whether a vehicle 61 is used as a shelter can change depending on whether the same vehicle 61 is continuously parked in the place at which the vehicle 61 was parked in the past.

Figure 9:
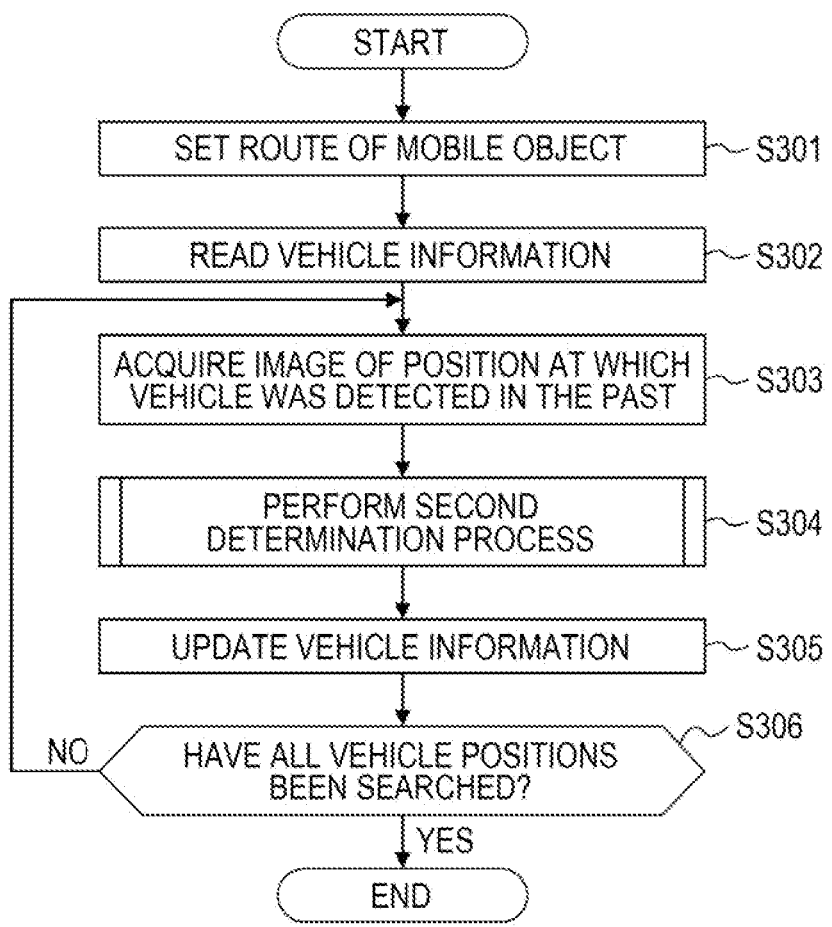
FIG. 9 is a flowchart illustrating a vehicle detection method according to another embodiment.

FIG. 9 is a flowchart illustrating an example of a second or later routine when the process of detecting a vehicle 61 is repeatedly performed. In FIG. 9, determination for a vehicle 61 which was detected in the past is performed. The routine illustrated in FIG. 9 may be performed in parallel with the routine illustrated in FIG. 7 while a mobile object 20 is flying along a moving route.

First, the control unit 14 of the server 10 sets a moving route of a mobile object 20 (Step S301).

The control unit 14 reads vehicle information of a vehicle 61 which was recognized in the past and which is located near the moving route from the storage unit 12 (Step S302). The vehicle information includes position information, identification information, and an evaluation value of the vehicle 61.

The control unit 14 causes the mobile object 20 to capture an image (a second image) of that position based on the position information of the vehicle 61 read from the storage unit 12. Accordingly, the control unit 14 acquires the image of the position at which the parked vehicle 61 was detected in the past from the mobile object 20 at a time other than a time at which the vehicle 61 was imaged in the past (Step S303).

Figure 10:
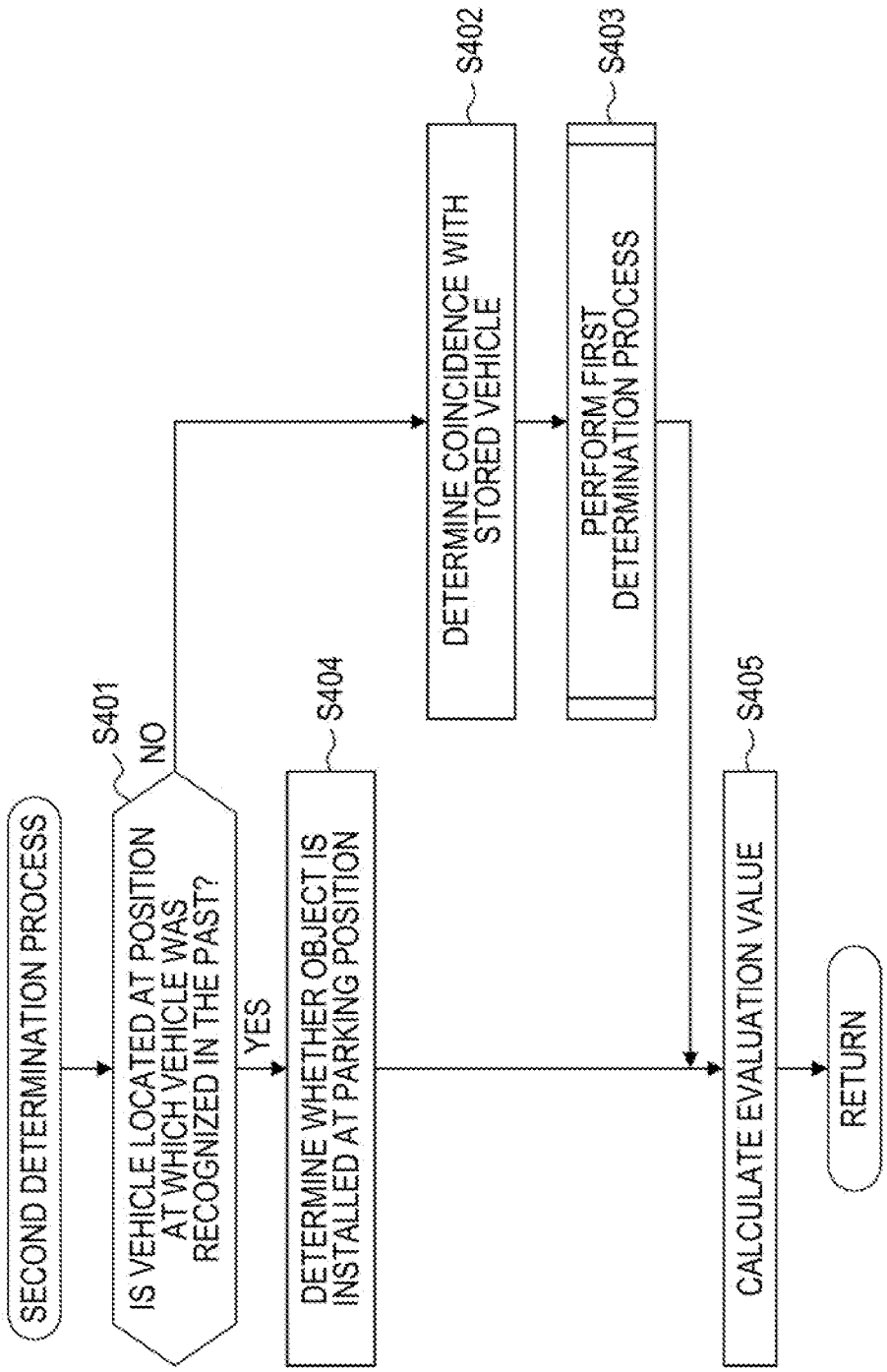
FIG. 10 is a flowchart illustrating a second determination process illustrated in FIG. 9.

The control unit 14 performs a second determination process based on the image acquired in Step S303 (Step S304). The second determination process will be described below with reference to FIG. 10.

First, the control unit 14 determines whether the vehicle 61 is located at the recognized position at which the vehicle 61 was parked in the past based on the image acquired from the mobile object 20 (Step S401).

When the vehicle 61 is located at the position at which the vehicle 61 was recognized in the past (Step S401: YES), the control unit 14 determines whether the vehicle 61 which is currently imaged is the same vehicle as the vehicle 61 stored in the storage unit 12 using the identification information (Step S402). The control unit 14 may perform a process of determining coincidence of the vehicles by storing the image of the vehicle 61 which was detected in the past in the storage unit 12 and comparing the currently captured image of the vehicle 61 with the image of the vehicle 61 which was captured in the past. After Step S402, the control unit 14 may newly calculate an evaluation value by performing the first determination process illustrated in FIG. 8 (Step S403).

When the vehicle 61 is not located at the position at which the vehicle 61 was recognized in the past (Step S401: NO), the control unit 14 determines whether an installed object is located at the position at which the vehicle 61 was parked in the past (Step S404). The installed object is an article that is used for saving a place such as a traffic sign cone, a PET bottle filled with water or the like, or a ground sheet. When such an installed object is located, the vehicle 61 which was parked in the past often returns to the same place. For example, an evacuee in a disaster may often park the vehicle 61 in the same place as a shelter only in the night time.

The control unit 14 calculates an evaluation value based on the results of Steps S401 to S404 (Step S405).

For example, when it is determined in Step S402 that the vehicle 61 is parked at the same position as the position at which the vehicle 61 was recognized in the past, the control unit 14 may employ the higher evaluation value of an evaluation value calculated in the past and an evaluation value calculated in Step S403 as a new evaluation value. The control unit 14 may determine that there is a high likelihood that the vehicle 61 is used as a shelter and increase the evaluation value. For example, when the same vehicle 61 is not located at the position at which the vehicle 61 was recognized in the past and another vehicle 61 is parked at that position, the control unit 14 may delete the vehicle information of the original vehicle 61. In this case, the evaluation value calculated in Step S403 is assigned to the vehicle 61 which is newly recognized.

For example, when it is determined in Step S404 that there is no installed object at the parking position, the control unit 14 may maintain the evaluation value of the vehicle 61 or decrease the evaluation value. In this case, since there is a likelihood that the vehicle 61 will be temporarily used for transportation, the vehicle information of the vehicle 61 may not be deleted. When it is determined in Step S404 that there is an installed object at the parking position, there is a high likelihood that the vehicle 61 parked at that position in the past will return to the same position and thus the control unit 14 may evaluate that there is a higher likelihood that the vehicle 61 is used as a shelter in comparison with a case in which there is no installed object.

After Step S404, the control unit 14 performs the process of Step S305 in FIG. 9. The control unit 14 updates the vehicle information of the recognized vehicle 61 stored in the storage unit 12.

Until the mobile objects 20 move along all the moving routes and all the vehicles 61 read from the vehicle information are searched for (Step S306: NO), the control unit 14 repeatedly performs the processes of Steps S303 to S305. When the mobile objects 20 move along all the moving routes and the control unit 14 completes search for all the vehicles 61 are searched for (Step S306: YES), the vehicle detection process ends.

Accordingly, the control unit 14 can evaluate that a vehicle 61 which is parked at the same parking position for a long time and a vehicle 61 which first departs from the parking position and returns to the same position have a high likelihood that the vehicle is used as a shelter.

As described above, according to this embodiment, the server 10 can determine a vehicle 61 with a high likelihood that it is used as a shelter based on an image captured by a mobile object 20. With the method according to the present disclosure, it is possible to easily identify a vehicle 61 which is used as a shelter using image processing without requiring human labor. Accordingly, the server 10 can provide a position and identification information of a vehicle 61 with a high likelihood that it is used as a shelter to governments, local governments, organizations for supporting evacuees, and the like. As a result, governments, local governments, organizations for supporting evacuees, and the like can appropriately send relief supplies and information to the vehicle 61.

The disclosure is not limited to the aforementioned embodiment and can be modified or corrected in various forms. For example, the means and the functions included in the steps can be rearranged unless logical confliction arises, and two or more means or steps or the like may be combined into a single means or step or a single means or step may be divided.

For example, in the aforementioned embodiment, a mobile object 20 transmits an image captured by the camera 22 to the server 10 and the server 10 performs an image recognizing process. However, the functions can be distributed to the control unit 26 of the mobile object 20 and the control unit 14 of the server 10 in various forms. For example, the control unit 26 of the mobile object 20 may recognize a vehicle 61 from an image captured by the camera 22 and sequentially transmit only an image of the recognized vehicle 61 and a nearby area thereof to the server 10.

In the aforementioned embodiment, the map information database 13 is included in the server 10, but the map information database 13 may be provided separately from the server 10. When route information is received from the server 10, a mobile object 20 may be configured to acquire map information from the map information database 13 which is provided separately from the server 10. The mobile object 20 may store necessary map information in advance.

In the aforementioned embodiment, description is based on the premise that each mobile object 20 is an unmanned aircraft. However, an automated driving vehicle may be used as each mobile object 20. In this case, the mobile object 20 searches for a vehicle 61 which is used as a shelter while moving to the road 51 and the parking lots 52 instead of flying in the sky. In the aforementioned embodiment, the camera 22 is mounted in each mobile object 20. However, the camera according to the present disclosure can include a monitoring camera which is installed in the street in addition to the camera mounted in the mobile object.

The method of detecting a vehicle 61 described in this specification can be performed in accordance with a program by the processors included in the server 10 and the mobile object 20. Such a program can be stored in a non-transitory computer-readable medium. Examples of the non-transitory computer-readable medium include a hard disk, a RAM, a ROM, a flash memory, a CD-ROM, an optical storage device, and a magnetic storage device, but are not limited thereto.

What is claimed is:

1. A server comprising a processor configured to determine whether a parked vehicle is used as a shelter based on a first image which is included in an image captured by a camera and which is obtained by imaging the vehicle and surroundings of the vehicle, wherein:
   the first image includes an image from a far-infrared camera that is able to measure a temperature of a subject as at least a part of the first image; and
   the processor is configured to evaluate that there is a higher likelihood that the vehicle is used as a shelter when it is recognized from the image from the far-infrared camera that at least a part of the vehicle has a temperature different from that of surroundings than when it is recognized that at least a part of the vehicle does not have a temperature different from that of the surroundings.

2. The server according to claim 1, wherein the processor is configured to evaluate that there is a higher likelihood that the vehicle is used as a shelter when an image of a predetermined article is included in the first image than when the article is not included in the first image.

3. The server according to claim 2, wherein the predetermined article includes at least one of a tent, a chair, a table, an article of clothing, and a ground sheet.

4. The server according to claim 1, wherein the processor is configured to evaluate that there is a higher likelihood that the vehicle is used as a shelter when it is recognized from the first image that a person is in the vehicle than when it is recognized that a person is not in the vehicle.

5. The server according to claim 1, wherein the processor is configured to evaluate that there is a higher likelihood that the vehicle is used as a shelter when it is recognized from the first image that a window or a door of the vehicle is open than when it is recognized that a window or a door of the vehicle is not open.

6. The server according to claim 1, wherein the processor is configured to evaluate that there is a higher likelihood that the vehicle is used as a shelter when it is recognized from the first image that a member for preventing the inside from being viewed from the outside of the vehicle is disposed on a window of the vehicle than when the member is not recognized.

7. The server according to claim 1, wherein the processor is configured to further acquire a second image which is captured by the camera at a time different from a time at which the parked vehicle has been imaged at the position at which the parked vehicle has been imaged, and
   wherein the processor is configured to evaluate that there is a higher likelihood that the vehicle is used as a shelter when the vehicle is not included in the second image and an object installed at the position at which the vehicle is parked is included in the second image than when the object is not included in the second image.

8. The server according to claim 1, wherein the camera is mounted in a mobile object, and
   wherein the processor is configured to move the mobile object such that the first image is captured in at least one of a distance in a predetermined range and a direction in a predetermined range with respect to a direction of the vehicle when it is recognized that the parked vehicle is included in the image.

9. The server according to claim 1, wherein the camera is mounted in a mobile object, and
   wherein the processor is configured to recognize identification information of the vehicle based on the first image, to acquire position information of the vehicle from the mobile object, and to transmit the identification information and the position information of the vehicle to the outside when it is determined that an evaluation value indicating a likelihood that the vehicle is used as a shelter is higher than a predetermined value.

10. A vehicle detection system comprising:
    a mobile object that includes a camera; and
    a server that is able to communicate with the mobile object, wherein
    the server includes a processor configured to determine whether a parked vehicle is used as a shelter based on a first image which is included in an image captured by the camera and which is obtained by imaging the vehicle and surroundings of the vehicle,
    the mobile object transmits position information of the vehicle to the server, and
    the processor of the server is configured to recognize identification information of the vehicle based on the first image, to acquire position information of the vehicle from the mobile object, and to transmit the identification information and the position information of the vehicle to the outside when it is determined that an evaluation value indicating a likelihood that the vehicle is used as a shelter is higher than a predetermined value.

11. The vehicle detection system according to claim 10, wherein the processor of the server is configured to evaluate that there is a higher likelihood that the vehicle is used as a shelter when an image of a predetermined article is included in the first image than when the article is not included in the first image.

12. The vehicle detection system according to claim 11, wherein the predetermined article includes at least one of a tent, a chair, a table, an article of clothing, and a ground sheet.

13. The vehicle detection system according to claim 10, wherein the mobile object captures a second image at a time different from the time at which the parked vehicle has been imaged at the same position at which the parked vehicle has been imaged, and wherein the processor of the server is configured to acquire the second image and to evaluate that there is a higher likelihood that the vehicle is used as a shelter when the vehicle is not included in the second image and an object installed at the position at which the vehicle is parked is included in the second image than when the object is not included in the second image.

14. A vehicle detection method comprising causing a processor to determine whether a parked vehicle is used as a shelter based on a first image which is included in an image captured by a camera and which is obtained by imaging the vehicle and surroundings of the vehicle, wherein:

the processor recognizes identification information of the vehicle based on the first image;

the processor acquires position information of the vehicle from the mobile object having the camera mounted therein; and the processor transmits the identification information and the position information of the vehicle to the outside when it is determined that an evaluation value indicating a likelihood that the vehicle is used as a shelter is higher than a predetermined value.

15. The vehicle detection method according to claim 14, wherein the processor is configured to evaluate that there is a higher likelihood that the vehicle is used as a shelter when an image of a predetermined article is included in the first image than when the article is not included in the first image.

16. The vehicle detection method according to claim 15, wherein the predetermined article includes at least one of a tent, a chair, a table, clothes, and a ground sheet.

17. The vehicle detection method according to claim 14, wherein the processor further acquires a second image which is captured by the camera at a time different from the time at which the parked vehicle has been imaged at the same position at which the parked vehicle has been imaged, and wherein the processor evaluates that there is a higher likelihood that the vehicle is used as a shelter when the vehicle is not included in the second image and an object installed at the position at which the vehicle is parked is included in the second image than when the object is not included in the second image.

* * * * *